Sept. 25, 1962
G. R. RYAN ET AL
3,055,220
HYDROMETER
Filed Sept. 28, 1960
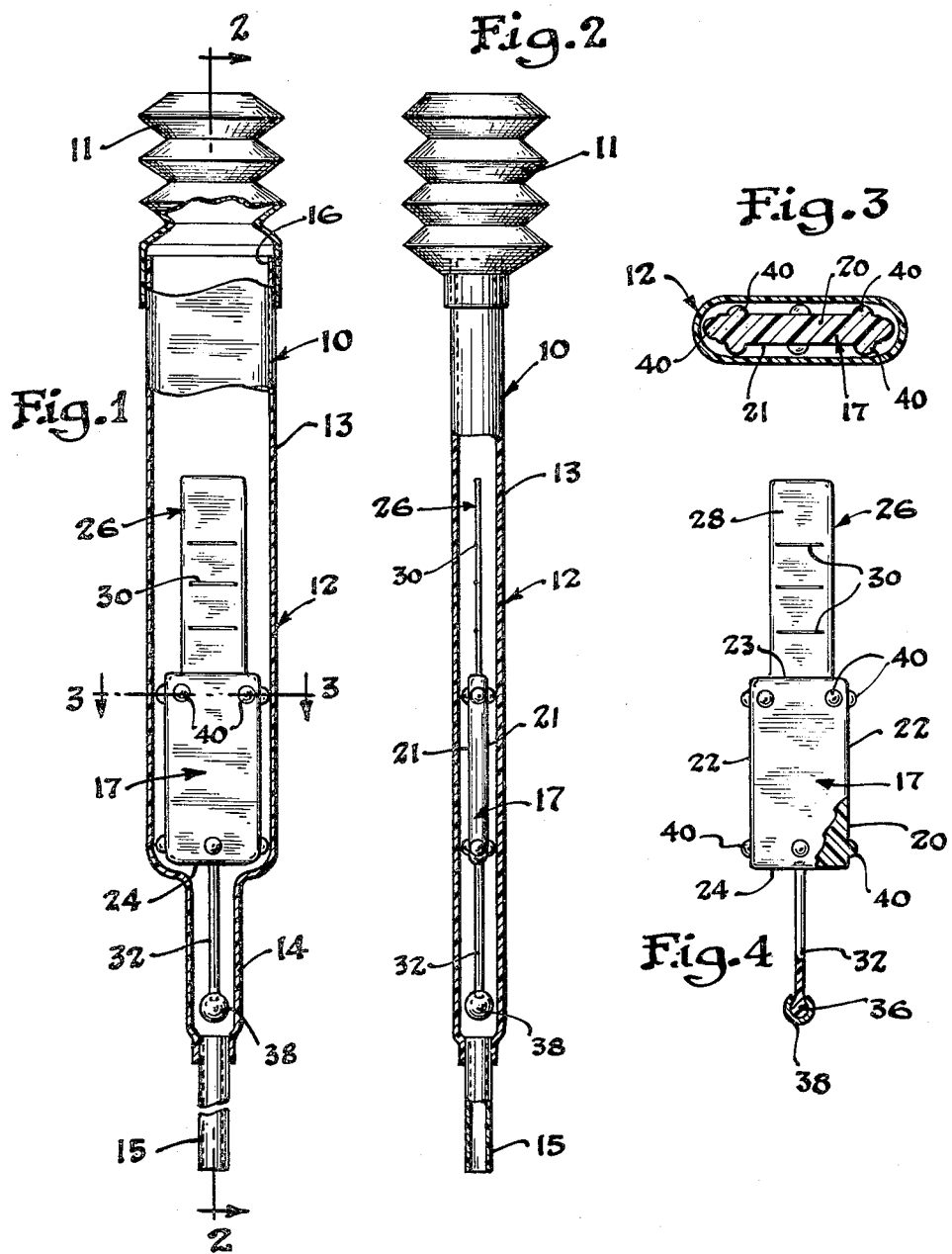
Inventors
George R. Ryan
Frank F. Ferry

United States Patent Office 3,055,220
Patented Sept. 25, 1962

3,055,220
HYDROMETER
George R. Ryan, 1431 Henry Place, Waukegan, Ill., and Frank F. Ferry, Jr., Box 49, Rte. 2, Cambridge, Wis.
Filed Sept. 28, 1960, Ser. No. 59,063
7 Claims. (Cl. 73—446)

The present invention relates generally to an improved specific gravity indicator and more particularly to an improved hydrometer for measuring the specific gravity of liquids.

The conventional specific gravity indicator or hydrometer is comprised of a hollow, transparent, tubular body section provided with means for forming a suction at one end thereof to draw liquid into the body section through an inlet spout and having therein a float element supporting a specific gravity scale. The float element has an enlarged hollow central portion or air chamber with the scale extending upwardly from the central portion and a weighted lower end portion. In order to have the float element of a conventional hydrometer assume an upright position and float freely within the hydrometer body section, the lower end of the float element must be weighted with a high density material such as iron, lead, or mercury, which generally is sealably enclosed within the float.

It is necessary to calibrate accurately the conventional float element during the process of manufacturing the hydrometer. One common method of calibrating the float element of the hydrometer is to accurately adjust the amount of metal used to weight the end of the float, as by adding or withdrawing metal shot or liquid mercury from the lower end of the float element until a correct reading is indicated on the hydrometer scale for a given test solution. If desired, the hydrometer can also be calibrated by moving the scale of the float element vertically on the upwardly extending portion of the float until a correct specific gravity reading is indicated for the test solution. In the latter calibration method, it is unnecessary to add or subtract from the metal used to weight the lower end portion of the float. Both the foregoing calibration procedures, however, obviously require considerable handling and substantially increase the cost of the hydrometer.

In previous attempts to overcome the foregoing objectionable features encountered in manufacturing hydrometers or the like, as by fabricating hydrometers entirely of molded plastic parts, the float element thereof has not been freely movable within the hydrometer float chamber and has frequently been subject to "holdup" within the said chamber, thereby giving inaccurate specific gravity readings.

It is therefore a principal object of the present invention to provide an inexpensive and highly reliable specific gravity indicator.

It is also an object of the present invention to provide a specific gravity indicator having a float member which provides highly accurate specific gravity readings without requiring calibration thereof during the manufacturing process.

It is a further object of the present invention to provide a specific gravity indicator which has a float member with the scale thereof integrally formed with the float member.

It is a still further object of the present invention to provide a specific gravity indicator with a plastic float element having the lower end portion thereof weighted with a plastic composition which is not sealably enclosed within the body of the float member.

It is also an object of the present invention to provide an improved plastic hydrometer with a plastic float member having the weight element at the lower end thereof which substantially lowers the center of gravity of the float member without significantly lowering the center of buoyancy.

Other objects of the present invention will be apparent from the following detailed description and claims to follow when read in conjunction with the accompanying drawing wherein:

FIG. 1 is a vertical sectional view of a specific gravity indicator embodying the present invention.

FIG. 2 is a fragmentary vertical sectional view of said specific gravity indicator along the line 2—2 of FIG. 1.

FIG. 3 is a transverse sectional view of said specific gravity indicator along the line 3—3 of FIG. 1; and FIG. 4 is a side elevational view partially in vertical section of the float element shown in FIGS. 2 and 3.

When molding or otherwise fabricating a hydrometer body and float element of a relatively low density plastic material, such as polypropylene or polyethylene, and using a plastic-metal composition which has a substantially lower specific gravity than the usual high density metals for weighting the lower end of the hydrometer float, a special problem is presented because the volume and buoyancy of the plastic and plastic-metal composition parts of the float element becomes appreciable relative to the weight thereof and this tends to significantly lower the center of buoyancy of the float relative to the center of gravity, thereby tending to cause the float to tilt away from a vertical position when floated in a liquid.

In the plastic float of a hydrometer embodying the present invention, the center of buoyancy of the float element is maintained appreciably above its center of gravity by providing improved means for positioning a weight spaced appreciably below the lower end of the body section thereof. The improved means is comprised of a small diameter axial rod which has a very small diameter and cross-sectional area compared with those dimensions of the body section of the float element, and therefore displaces only a relatively small volume of liquid. The rod, thus, has no appreciable tendency to lower the center of buoyancy of the float member. It will be apparent that if the lower portion of the solid plastic float were to have the usual large diameter cylindrical form for supporting the weight element, the center of buoyancy of the float would be appreciably lowered because of the large volume occupied by the low density polyethylene or polypropylene plastic. Also, by having the plastic rod formed of a low density plastic material which does not add significantly to the total weight of the float, it is possible to have substantially all of the weight which can be added to the float spaced well below the float body section where the weight is most effective in lowering the center of gravity.

The present invention will be understood fully by referring to the accompanying drawing wherein the specific gravity indicator or hydrometer 10 is shown as comprising a form-retaining generally flattened tubular float chamber 12 having a transparent upper chamber portion 13 and a reduced diameter lower chamber portion 14. The upper end 16 of the chamber portion 13 is sealably engaged by a flexible plastic bellows or bulb-like member 11 adapted to draw liquid into chamber 12 and having the lower end of the chamber portion 14 provided with a small diameter tubular fluid conduit or nozzle member 15. A float element 17 is enclosed within the chamber 12 and is freely movable vertically therein.

The float element 17 comprises a molded solid plastic main body section 20 formed of a low density plastic material having a generally rectangular form with spaced parallel lateral walls 21 of a width less than the inner major diameter of the chamber portion 13. The density of the plastic material is in every case less than the density of the solution being measured. The lateral walls 21 are spaced less than the transverse width of the chamber portion 13 and are joined by spaced side walls 22 and top and bottom walls 23, 24 respectively. The lateral walls 21 and the side walls 22 are provided with a plurality of spaced projections 40 extending outwardly from the body section 20 so as to space the body section 20 substantially equidistant from the interior and wall surfaces of the float chamber portion 13.

Extending upwardly from the top wall 23 in a generally axial plane is a rigid scale section 26 with spaced flat wall portion 28 having a width less than the interior diameter of the body section 20 and disposed symmetrically with respect to the lateral walls 21 and side walls 22. Specific gravity indicia 30 are formed on at least one of the flat wall surfaces 28. The scale section 26 has a length sufficient to accommodate specific gravity readings extending over the entire range of the solutions which are to be measured with said indicia being of a size which can be easily read.

A small diameter rod 32 which occupies a very small volume relative to the volume of said body section 20 projects axially from the bottom wall 24 of the float element 17. The lower end of the rod 32 preferably has an end portion 36 to which a weight member 38 is secured, as by a "snap fit" engagement with the end portion 36. The weight member 38 is preferably formed of a lead-polyvinyl chloride plastic composition molded in spherical form with a cylindrical opening in one side thereof having a slightly smaller diameter than the diameter of the enlarged end portion 36 so as to be frictionally held thereon.

The specific dimensions of the main body section 20 of the float element 17 depends on the dimensions of the scale section 26. Thus, a hydrometer which is to provide specific gravity readings between 1.100 and 1.300 for testing battery acid preferably has a length of 1.25 inches, a width of .500 inch and a thickness of .03 inch, since a scale of the foregoing dimensions can be conveniently read. With a scale section 26 of the foregoing size, the volume of the body section 20 is fixed at 1.67 cc. And, since the total weight of the body section 20 and the scale section 26 must equal the volume of the float times the density of the most dense liquid to be measured, such as a battery acid solution having a density of 1.300, the float member 17 must have a total weight of 2.17 grams. The distribution of the 2.17 grams comprising the total weight of the float member 17 is extremely important with regard to the proper operation of the hydrometer. Thus, unless the weight is properly distributed the float element 17 will not assume a vertical position when tilted in any direction unless the center of gravity of the float is below the center of buoyancy thereof.

In the float element 17 of the present invention which preferably is molded of polypropylene having a density of from 0.89 to 0.90, the proper weight distribution is achieved by having the body section 20 molded with a height of 1.100 inches, a width of 0.649 inch, and a thickness of 0.125 inch. The center of buoyancy of the float is maintained appreciably above the center of gravity thereof by having the weight member 38 spaced appreciably from the bottom wall 24 of the body section 20 by means of the small diameter cylindrical axial rod 32 having a length of 0.900 inch and a diameter of $3/32$ inches. Since the rod 32 has a relatively small diameter and cross-sectional area, it occupies a relatively small volume and thus has no appreciable tendency to lower the center of buoyancy of the float element 17. The weight member 38 is comprised of a lead-polyvinyl chloride plastic having a density of about 3.8 in the form of a sphere with a radial passage in one side thereof and having a diameter of about ¼ inch. The spherical member 38 is preferably mounted on the end of the rod 32 by snap fitting over the enlarged end thereof.

It will be understood that the improved all plastic hydrometer of the present invention can be adapted to measuring the specific gravity of other fluids, such as automotive radiator anti-freeze solutions, by properly dimensioning the float element and associated parts of the hydrometer in accordance with the principles disclosed herein.

Others may practice the invention in any of the numerous ways which are suggested to one skilled in the art, by this disclosure, and all such practice of invention are considered to be a part hereof and falls within the scope of the appended claims.

We claim:

1. A specific gravity indicator comprising, a transparent elongated tubular float chamber, a means secured to the float chamber adapted to draw liquid into said float chamber, a solid plastic float element retained within said float chamber and freely reciprocal therein, said float element having a main body section and an integral scale section extending upwardly therefrom and having a weight element mounted on a small diameter rod member extending axially from said body section and spaced substantially below the lower edge of said body section; whereby the center of gravity of said float element is substantially below the center of buoyancy thereof.

2. A specific gravity indicator comprising, transparent elongated tubular float chamber formed of a plastic composition, a suction means secured to one end of said chamber adapted to draw liquid into said float chamber, a solid plastic float element retained within said float chamber and freely reciprocal therein, said float element having a main body section and an integral scale section of smaller width and thickness than said body section extending upwardly therefrom and having a weight element mounted on a small diameter rod member extending axially from said body section and spaced below the lower edge of said body section a distance approximately the length of said body section; whereby the center of gravity of said float element is substantially below the center of buoyancy thereof.

3. A specific gravity indicator comprising, an elongated tubular float chamber formed of a plastic composition, said float chamber having a transparent upper chamber portion and a reduced diameter lower chamber portion, a flexible means secured to the upper chamber portion adapted to draw liquid into said float chamber, a solid plastic float element disposed within said float chamber and freely reciprocal therein, said float element having a main body section and an integral scale section of smaller width and thickness than said body section extending upwardly therefrom and having a weight element secured to the lower portion of said body section by means of an elongated small diameter connecting section of plastic formed integrally with said body section and said connecting section capable of displacing a volume of liquid substantially smaller than that of said body section; whereby the center of gravity is substantially below the center of buoyancy of said float element.

4. A specific gravity indicator comprising, an elongated flat tubular float chamber formed of a plastic composition, said float chamber having a transparent upper chamber portion and a reduced diameter lower chamber portion, a flexible means secured to the upper chamber portion adapted to draw liquid into said float chamber, a solid plastic float element disposed within said float chamber having a flattened main body section and an integral thin scale section extending upwardly therefrom of smaller width and thickness than said body section, said float element having a density of less than water, said float element having a plastic-metal weight element secured in spaced relationship to the lower portion of said body section by means of a small diameter connecting section of plastic formed integrally with said body section and capable of displacing a volume of liquid substantially smaller than that of said body section; whereby the center 5. In a specific gravity indicator having a tubular body section, a flexible means for drawing liquid into said chamber and a float element freely reciprocal therein, the improvement comprising; a solid plastic float element having a main body section and an upwardly extending scale section formed integrally therewith, and a weight element connected to and spaced from the lower portion of said body section and a small diameter connecting section formed integrally therewith, and said connecting section capable of displacing a volume of liquid which comprises only a small fraction of the volume of liquid displaced by said body section; whereby said center of gravity of said float element is substantially below the center of buoyancy thereof.

6. In a specific gravity indicator having a tubular body section, a flexible means for drawing liquid into said chamber and a float element freely reciprocal therein, the improvement comprising; a solid plastic float element molded of a plastic composition having a specific gravity less than 1.0 which is formed of a main body section with an upwardly extending scale section integral therewith, an axial rod section extending downwardly from the lower edge of said body section having a diameter substantially less than the major diameter of said body section, and a weight element secured to the lower end of said rod section; whereby the center of gravity of the said float element is substantially below the center of buoyancy thereof.

7. In a specific gravity indicator having a tubular body section, a flexible means for drawing liquid into said chamber and a float element freely reciprocal therein, the improvement comprising; a solid molded plastic float element having a main body section of a flattened rectangular form with an upwardly extending thin flat scale section and a downwardly extending axial rod section having a diameter substantially smaller than the major diameter of said body section and a plastic-metal weight element secured to the lower end of said rod section; whereby the center of gravity of the said float element is substantially below the center of buoyancy thereof.

References Cited in the file of this patent

UNITED STATES PATENTS

| | | |
|---|---|---|
| 907,107 | Courtois | Dec. 15, 1908 |
| 1,550,412 | Albrecht et al. | Aug. 18, 1925 |
| 1,564,530 | Clifford | Dec. 8, 1925 |
| 1,978,185 | Booss | Oct. 23, 1934 |